United States Patent
Anderson (10) Patent No.: US 7,635,461 B2
(45) Date of Patent: Dec. 22, 2009

(54) COMPOSITE COMBUSTION CATALYST AND ASSOCIATED METHODS

(75) Inventor: Scott L. Anderson, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 929 days.

(21) Appl. No.: 10/862,829

(22) Filed: Jun. 7, 2004

(65) Prior Publication Data

US 2004/0265214 A1 Dec. 30, 2004

Related U.S. Application Data

(60) Provisional application No. 60/476,343, filed on Jun. 6, 2003.

(51) Int. Cl.
*B01J 23/00* (2006.01)
*B01J 21/00* (2006.01)
*C01B 13/00* (2006.01)

(52) U.S. Cl. .................. 423/579; 502/241; 502/242; 502/243; 502/252; 502/258; 502/259; 502/262; 502/263; 502/302; 502/304; 502/327; 502/328; 502/330; 502/332; 502/333; 502/334; 502/335; 502/336; 502/337; 502/339; 502/341; 502/344; 502/349; 502/350; 502/351; 502/352; 502/324; 502/355; 502/415; 502/439

(58) Field of Classification Search ............... 502/241, 502/242, 243, 252, 258, 259, 262, 263, 302, 502/304, 327, 328, 330, 332, 333, 334, 335, 502/336, 337, 338, 339, 341, 344, 349, 350, 502/351, 352, 324, 355, 415, 439; 423/579

See application file for complete search history.

(56) References Cited

U.S. PATENT DOCUMENTS 3,479,276 A * 11/1969 Becker et al. .......... 204/290.08
3,503,783 A * 3/1970 Evans ..................... 427/10
3,511,683 A * 5/1970 Heilwell et al. ........... 427/216

(Continued)

OTHER PUBLICATIONS

Coguill, Scott L., "Synthesis of Highly Loaded Gelled Propellants," posted Apr. 21, 2004 on www.resodyn.com.

(Continued)

*Primary Examiner*—Cam N Nguyen
(74) *Attorney, Agent, or Firm*—Thorpe North & Western LLP (57) ABSTRACT

Composite combustion catalyst particles are described and disclosed. A metal core of a combustible metal can be coated with a metal oxide coating. Additionally, a catalyst coating can at least partially surround the metal oxide coating to form a composite catalyst particle. The composite catalyst particles can be dispersed in a variety of fuels such as propulsion fuels and the like to form an enhanced fuel. During initial stages of combustion, the catalyst coating acts to increase combustion of the fuel. As combustion proceeds, the metal core heats sufficiently to disturb the metal oxide coating. The metal core then combusts in highly exothermic reactions with an oxidizer and the catalyst coating to provide improved energy densities to the enhanced fuel. Enhanced fuels using these composite combustion catalyst particles can exhibit decreased ignition delay times and increased energy densities sufficient for use in high performance propulsion applications such as pulse detonation engines, scramjets, and ramjets.

43 Claims, 3 Drawing Sheets

U.S. PATENT DOCUMENTS

| | | | | |
|---|---|---|---|---|
| 3,615,166 | A * | 10/1971 | Hindin et al. | ............ 423/239.1 |
| 3,745,077 | A | 7/1973 | Jones | |
| 3,861,138 | A | 1/1975 | Bridgeforth, Jr. et al. | |
| 4,017,527 | A | 4/1977 | Merkl | |
| 4,440,874 | A * | 4/1984 | Thompson | .................. 502/327 |
| 4,797,329 | A * | 1/1989 | Kilbane et al. | .............. 428/623 |
| 5,170,624 | A * | 12/1992 | Cornelison et al. | ............ 60/300 |
| 5,174,968 | A * | 12/1992 | Whittenberger | ............. 422/174 |
| 5,179,059 | A * | 1/1993 | Domesle et al. | ............ 502/303 |
| 5,258,349 | A | 11/1993 | Dalla Betta et al. | |
| 5,441,706 | A * | 8/1995 | Whittenberger | ............. 422/174 |
| 5,451,277 | A | 9/1995 | Katzakian et al. | |
| 5,693,207 | A * | 12/1997 | Fromson et al. | ............ 205/112 |
| 5,771,679 | A | 6/1998 | Taylor, Jr. et al. | |
| 5,846,495 | A * | 12/1998 | Whittenberger et al. | ..... 422/180 |
| 5,935,889 | A * | 8/1999 | Murrell et al. | ................. 502/9 |
| 6,071,850 | A * | 6/2000 | Friedman et al. | ............ 502/439 |
| 6,107,239 | A * | 8/2000 | Qin et al. | .................... 502/300 |
| 6,140,266 | A * | 10/2000 | Corrigan et al. | ............. 502/439 |
| 6,177,381 | B1 * | 1/2001 | Jensen et al. | ................ 502/325 |
| 6,179,899 | B1 | 1/2001 | Higa et al. | |
| 6,214,765 | B1 * | 4/2001 | Fromson et al. | ............. 502/355 |
| 6,299,654 | B1 | 10/2001 | Thompson | |
| 6,454,886 | B1 | 9/2002 | Martin et al. | |
| 6,503,350 | B2 | 1/2003 | Martin et al. | |
| 6,528,683 | B1 * | 3/2003 | Heidemann et al. | ......... 562/542 |
| 6,576,199 | B1 * | 6/2003 | Liu et al. | .................... 422/177 |
| 6,596,249 | B2 | 7/2003 | Lin et al. | |
| 6,613,168 | B2 | 9/2003 | Reed, Jr. et al. | |
| 6,613,383 | B1 | 9/2003 | George et al. | |
| 6,627,013 | B2 | 9/2003 | Carter, Jr. et al. | |
| 6,652,682 | B1 | 11/2003 | Fawls et al. | |
| 6,676,727 | B2 | 1/2004 | Pozarnsky | |
| 6,679,960 | B2 | 1/2004 | Jones | |
| 6,710,003 | B2 * | 3/2004 | Jan et al. | ...................... 502/60 |
| 6,713,177 | B2 | 3/2004 | George et al. | |
| 6,737,463 | B2 | 5/2004 | Yadav et al. | |
| 6,858,769 | B2 * | 2/2005 | Woodle et al. | .............. 585/658 |
| 2002/0049132 | A1 * | 4/2002 | Jan et al. | ...................... 502/60 |
| 2004/0175313 | A1 * | 9/2004 | Foor et al. | ................... 423/219 |

OTHER PUBLICATIONS

Miller, P.J., C.D. Bedford and J.J. Davis, "Effect of Metal Particle Size on the Detonation Properties of Various Metallized Explosives," 11$^{th}$ International Detonation Symposium Aug. 31-Sep. 4, 1998.

Brousseau, Patrick, Helen E. Dorsett, Matthew D. Cliff, and C. John Anderson, "Detonation Properties of Explosives Containing Nanometric Aluminum Powder," 12$^{th}$ International Detonation Symposium Aug. 11-16, 2002.

Palaszewski, Bryan, "Nanotechnology and Gelled Cryogenic Fuels," http://sbir.grc.nasa.gov/launch/ RACNanotechnologyGelledFuelsDastoorHQ05-2001_brief.pdf accessed May 26, 2004.

Baschung, B., D. Grune, H.H. Licht, and M. Samirant, "Combustion Phenomena of a Solid Propellant Based on Aluminium Powder," accessed May 26, 2004 from www.argonide.com.

Nakra, S., J. Lu, and Scott L. Anderson, "Prospects for Nanocatalysis in Propulsion Applications," Proc. 16$^{th}$ ONR Propulsion Meeting, U.S. California, Jun. 9-11, 2003.

* cited by examiner

COMPOSITE COMBUSTION CATALYST AND ASSOCIATED METHODS

CLAIM OF PRIORITY

This application claims priority to U.S. Provisional Application No. 60/476,343, filed Jun. 6, 2003, which is incorporated by reference herein in its entirety.

FEDERAL RESEARCH STATEMENT

This invention was made with support from the United States Government, and the United States Government may have certain rights in this invention pursuant to ONR Grant No. N00014-01-1-0541.

FIELD OF THE INVENTION

The present invention relates to materials and methods for use in connection with combustion fuels. More particularly, the present invention relates to catalyst particulates and methods of making such particulates, which provide catalytic effect and fuel value to various fuels. Accordingly, the present invention involves the fields of chemistry, combustion, metallurgy, and materials science.

BACKGROUND OF THE INVENTION

Combustion of various chemical species involves a number of important considerations which can vary from one application to another. One recent area of interest in combustion chemistry is the enhancement of fuels for use in hypersonic jets and other high performance propulsion systems. In such applications, very fast fuel combustion is required for efficient propulsion. For example, in a ramjet or scramjet engine, the high volumetric air flow through the engine requires that combustion takes place on the millisecond or sub-millisecond time frame. This short combustion time frame is important so that combustion is substantially complete before the fuel-air mixture exits the engine. Unfortunately, much of the residence time is required for fuel-air mixing, making combustion on a substantially shorter time scale desirable. Another example of a high performance propulsion system is pulse-detonation engines (PDEs), where the fuel-air mixture combusts as a detonation wave propagates through the engine combustion chamber. Successful propagation of a detonation wave typically requires a sufficiently high rate of combustion to feed the combustion energy into driving the shock wave. The combustion time can depend on the engine tube diameter, but a typical value for the desired combustion time can be less than 100 microseconds. Further, current fuels have a limited energy density, especially when combined with materials having heats of combustion significantly below that of the fuel.

For high speed propulsion systems, the fuel and gas flow should be unimpeded. Thus, fixed catalyst beds are generally not suitable for use in such systems. Further, combustion rates must be increased, while ignition delays should be decreased. Any attempt to improve these aspects should also avoid substantial degradation of the energy density of the fuel.

In order to solve these and other problems, metallized propellants have become known in the art. These metallized propellants typically disperse aluminum or boron particles in a solid or liquid fuel, often as a gelled propellant. Aluminum and boron have high volumetric heats of combustion, relative to typical hydrocarbon fuels. As such, metallized propellants potentially have improved energy content relative to pure hydrocarbons. However, these metallized propellants can also present difficulties with respect to combustion times and efficiencies. These difficulties can reduce their usefulness for many combustion applications and particularly for applications requiring short combustion time scales. As such, materials and methods for improved high speed propulsion fuels and methods continue to be sought.

SUMMARY OF THE INVENTION

Accordingly, the present invention provides composite combustion catalyst particles which are suitable for use in various fuels with decreased ignition delays and increased combustion rates. In one aspect, a composite combustion catalyst particle can include a metal core including a combustible metal. The metal core can include a metal oxide coating at least partially surrounding the metal core. Additionally, a catalyst coating can at least partially surround the metal oxide coating or metal core.

In one detailed aspect of the present invention, the combustible metal can be aluminum, boron, magnesium, silicon, titanium, lithium, sodium, potassium, or alloys or composites thereof. In a more detailed aspect, the combustible metal can be aluminum.

Typically, the metal oxide coating can be a metal oxide of the combustible metal, i.e. a native oxide layer. Such metal oxide coatings can vary in thickness, and tend to have a thickness of about 2 nm to about 10 nm.

In yet another aspect of the present invention, the catalyst coating can include a metal which exhibits a catalytic effect for combustion of a fuel. Examples of suitable metals are palladium, platinum, and other noble metals which are known to be effective combustion catalysts. Many such metals can react exothermically with the combustible metal comprising the core of the particle to form intermetallic compounds, such as $Pd_xAl_y$ in the case of a palladium catalyst reacting with an aluminum metal core.

In yet another aspect of the present invention, the catalyst coating can include a metal oxide or other metal compound which exhibits a catalytic effect for combustion of a fuel. Examples of suitable metal compounds are rare earth metal oxides, transition metal oxides, and mixtures thereof or multi-metal compounds such as $N_xM_yO_z$, where N and M represent metallic elements, and O represents oxygen. Typically, such compounds can have a weaker affinity for oxygen than the combustible metal comprising the core of the particle, and thus can react exothermically with the metal core during the combustion process. Regardless of the specific catalyst material, the catalyst coating can have a thickness from about 0.5 nm to about 20 nm.

The composite combustion catalyst particle can be formed in a wide variety of sizes ranging from micron to nanosize particles. In one preferred aspect, the composite combustion catalyst particle is a nanoparticle. For example, composite nanoparticles can have a diameter from about 10 nm to about 500 nm, and in some cases from about 20 nm to about 100 nm. In some cases, such nanoparticles can be further aggregated to form particles in the micron size range.

In still another aspect of the present invention, the composite combustion catalyst particles can be dispersed in a fuel to produce an enhanced fuel. In this way, thorough dispersal can enhance intimate mixing of the hydrocarbon fuel with the composite combustion catalyst particles, and can disperse aggregated particles. Such dispersal can be obtained by mixing, stirring, ultrasonication, or other suitable methods. The hydrocarbon fuel can be either liquid or solid fuel. Liquid fuels such as jet propellant fuels, ramjet fuels, rocket fuels, kerosene, paraffin, and mixtures thereof can be used. Currently, of particular interest is the liquid fuel JP-10.

In order to maintain the volumetric energy density of the enhanced fuel, the composite combustion catalyst particles can have a volumetric heat of combustion ranging from about 80% to 250% of the volumetric heat of combustion of the hydrocarbon fuel. In terms of gravimetric energy density, the gravimetric heat of combustion of the composite combustion catalyst can range from about 50% to 150% relative to the gravimetric heat of combustion of the fuel. Further, although specific compositions can vary, the composite combustion catalyst particles can comprise from about 2 wt % to about 25 wt % of the enhanced fuel.

In accordance with another aspect of the present invention, the composite combustion catalyst particles can be produced by providing metal core particulates and forming a metal oxide coating substantially surrounding the metal core. A catalyst coating can then be formed on at least a portion of the metal oxide coating. The catalyst coating can be formed by a process such as chemical vapor deposition, physical vapor deposition, solution phase deposition, and other known coating techniques.

Advantageously, the composite combustion catalysts of the present invention provide both catalytic enhancement of combustion of the fuel, as well as combustion of the composite particle. More specifically, as the fuel is combusted, the metal core heats. The composition and configuration of the composite particles can provide for additional thermite-type reactions which are highly exothermic, enhance the combustion rate of the metal core, and contribute to the energy released during combustion of the enhanced fuel.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a" and "the" include plural referents unless the context clearly dictates otherwise. Thus, for example, reference to "a composite combustion catalyst particle" includes one or more of such particles, reference to "a coating" includes reference to one or more of such structures, and reference to "a coating process" includes reference to one or more of such processes.

Definitions

In describing and claiming the present invention, the following terminology will be used in accordance with the definitions set forth below.

As used herein, "combustible metal" refers to any metal which has a capacity for oxidation and release of heat and energy.

As used herein, "nanoparticle" refers to a particle having a diameter in the nanometer range, i.e. less than 1 μm. Typically, nanoparticles of the present invention can have a diameter less than about 500 nm, and more particularly from about 4 nm to about 500 nm.

As used herein with respect to an identified property or circumstance, "substantially" refers to a degree of deviation that is sufficient so as to not measurably detract from the identified property or circumstance. The exact degree of deviation allowable may in some cases depend on the specific context. Thus, for example, a composition which is "substantially different" from another composition will measurably deviate in combustion properties. Most often, one or more elements will be completely absent from the composition of interest, rather than a mere change in compositional percentages. Similarly, a coating which "substantially covers" a particle covers the entire particle surface, although a small percentage of the surface may be exposed, i.e. less than 5%, due to non-wetting or surface defects which may interfere with formation of the coating.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 10 nm to about 500 nm" should be interpreted to include not only the explicitly recited values of about 10 nm to about 500 nm, but also include individual values and sub-ranges within the indicated range. Thus, included in this numerical range are individual values such as 20, 30, and 40 and sub-ranges such as from 10-30, from 200-400, and from 20-50, etc. This same principle applies to ranges reciting only one numerical value. Furthermore, such an interpretation should apply regardless of the breadth of the range or the characteristics being described.

Invention

In accordance with the present invention, a composite combustion catalyst particle can include a metal core, a metal oxide coating at least partially surrounding the metal core, and a catalyst coating at least partially surrounding the metal oxide coating. The metal core can be formed of a combustible metal having a relatively high heat of combustion. The composite combustion catalyst particles of the present invention are designed to provide catalytic activity to combustion of a fuel, while also acting as a fuel additive for increased energy density.

The composite combustion catalyst particles can be used in a variety of applications. For example, the composite particles can be added to liquid or solid fuels for use in propulsion systems, explosives, munitions, turbines, or the like to form an enhanced fuel. Several exemplary applications will be discussed in more detail below. However, current preferred applications include dispersing the composite particles in a liquid fuel for use in jet fuels such as JP-10 and other similar high performance fuels.

Suitable materials for use as the combustible metal can include any metal which can be oxidized under standard combustion conditions to release an amount of energy comparable to the fuel in which it is used. Non-limiting examples of suitable combustible metals includes aluminum, boron, magnesium, silicon, titanium, lithium, sodium, potassium, and alloys or composites thereof. In one aspect of the present invention, the combustible metal can be aluminum, boron, magnesium, and alloys or composites thereof. Currently, the preferred combustible metal is aluminum. In an alternative aspect, the metal core can further comprise a second combustible metal. As an example of the typical ranges of heats of combustion, aluminum (having a native oxide layer of about 3 nm) has a volumetric heat of combustion of about 81,000 kJ/liter, while JP-10 liquid fuel has a volumetric heat of combustion of about 39,500 kJ/liter. Typically, suitable materials for use as the metal core have a heat of combustion greater than about 30,000 kJ/liter, although this can vary depending on the fuel with which the composite particles are used, and the application.

In order to maintain the volumetric energy density of the enhanced fuel, the composite combustion catalyst particles can have a volumetric heat of combustion ranging from about 80% to 250% of the volumetric heat of combustion of the hydrocarbon fuel. In terms of gravimetric energy density, the gravimetric heat of combustion of the composite combustion catalyst can range from about 50% to 150% relative to the gravimetric heat of combustion of the fuel. Further, although specific compositions can vary, the composite combustion catalyst particles can comprise from about 2 wt % to about 25 wt % of the enhanced fuel. As a general guideline, energy density of a fuel can be measured with reference to either gravimetric or volumetric bases. Gravimetric energy content (i.e., energy/mass) is an important property in applications which are weight-limited. Similarly, volumetric energy content (energy/unit volume) is an important property in applications that are limited by allowable volumes of fuel. For high performance propulsion systems, volume energy content is often a dominant factor, although gravimetric energy content can also affect flight distance and performance.

Metal core particles can be produced using known methods, e.g., physical vapor deposition (PVD), chemical vapor deposition (CVD), low vapor pressure condensation, explosion synthesis, shock wave synthesis, and decomposition of organo-metallic compounds, or obtained from commercial sources. The metal core particles can have an average particle diameter which allows the composite particles produced therewith to combust within a designed time frame. For example, high performance propulsion applications such as pulse detonation engines (PDE), scramjet, and ramjet require time frames for ignition delay and combustion of less than about 1 millisecond. However, as a general guideline, particles ranging from about 4 nm to about 500 μm can be suitable for various applications. In high performance applications, the metal core can typically have an average diameter from about 5 nm to about 500 nm, and preferably from about 20 nm to about 100 nm. Suitable metal core particles can be obtained from a variety of commercial sources such as nanoparticles from Argonide Corp., Nanotechnologies Corp., and other commercial suppliers.

In another aspect of the invention, a metal oxide coating can be present over at least a portion of the metal core. Most frequently, the metal oxide coating forms naturally around substantially the entire metal core upon exposure to air or other oxygen-containing environment. Thus, in some embodiments, the metal oxide coating can be a metal oxide of the combustible metal, e.g., a native oxide coating. However, in some embodiments, the native oxide layer can be avoided by maintaining an oxygen-free environment. In this way, a coating can be formed on the metal core which has a predetermined composition. For example, a metal oxide of a metal which is different than the combustible metal can be formed on the metal core particles. Alternatively, the catalyst coating can be formed directly on the metal core without an intermediate metal oxide coating, as discussed in more detail below. Depending on the specific metal, the metal oxide coating can have a thickness of about 2 nm to about 10 nm. In the case of aluminum, the metal oxide coating can be about 2 to 5 nm, and preferably about 2.9 nm. The metal oxide coating can provide a barrier between the metal core and the catalyst coating. However, a relatively thin native oxide coating can allow for improved overall heats of combustion, i.e. excessively thick metal oxide coatings can reduce the energy density of the composite combustion catalyst particles.

In another aspect of the present invention, the composite catalyst particles can include a catalyst coating. Generally, the catalyst coating can include any metal or metal compound which exhibits a catalytic effect for combustion of a fuel. Two broad classes of catalyst coating materials include catalytically active metals and catalytically active compounds. In one aspect, the catalyst coating can comprise a catalytically active metal, such as palladium, platinum, nickel, noble metals, or other transition metal or binary or ternary combination of such metals known to be effective combustion catalysts. Many such metals can react exothermically with the combustible metal comprising the core of the particle to form intermetallic compounds, such as $Pd_xAl_y$ in the case of palladium catalyst reacting with an aluminum metal core. Other suitable catalytically active metals include, but are not limited to, iridium, rhodium, ruthenium, and alloys or composites of these metals. In one preferred aspect, the catalyst coating can comprise palladium.

In yet another aspect of the present invention, the catalyst coating can comprise a metal oxide or other metal compound which exhibits a catalytic effect for combustion of a fuel. More specifically, the catalyst coating can comprise a catalytically active compound such as an inorganic oxide, or sulfide, of an alkaline-earth metal, a transition metal, a boron family element (boron, aluminum, gallium, indium, and thallium), rare-earth metals (atomic numbers 57 to 71, inclusive), and mixtures or alloys thereof. In one detailed aspect, suitable metal compounds can include rare earth metal oxides, transition metal oxides, and mixtures thereof. Several examples of suitable catalyst coating materials can include, but are not limited to, cerium oxide, palladium oxide, tin oxide, manganese oxide, yttrium oxide, iron oxide, cobalt oxide, and mixed oxides containing two or more metals, e.g., mixtures or multi-element oxides thereof such as $N_xM_yO_z$ where N and M are a metal and O represents oxygen. Typically, suitable catalyst materials can have a weaker affinity for oxygen than the combustible metal comprising the metal core of the particle, and thus can react exothermically with the metal core during the combustion process. Depending on the specific composition, the catalyst coating can have a thickness from about 0.5 nm to about 20 nm, although thicknesses outside this range can also be suitable depending on required combustion properties, particle size, fuel, etc.

In addition, the catalyst coating can be chosen to enhance combustion of the fuel. Particularly, catalyst coatings can help to reduce ignition delay times and provide increased combustion rates of the fuel. In some cases, the catalyst coating can also provide additional heat value. The currently preferred catalyst coating material is cerium oxide. Frequently, the native metal oxide layer on the metal core particle can also have a catalytic effect; however, the present invention covers coatings which are distinct from one another. Specifically, the native metal oxide coating and catalyst coatings have substantially different compositions.

The catalyst coating can be formed using known techniques or techniques to be developed in the future. Suitable coating techniques can form the catalyst coating on at least a portion of the metal oxide coating, and/or the metal core. Currently available techniques include chemical vapor deposition, solution phase deposition, physical vapor deposition, and combinations thereof. Typically, it can be desirable to avoid agglomeration of the particles during the coating process. Therefore, the particles can be dispersed in a fluid, e.g., solution phase deposition, or suspended in a fluidized bed reactor or other similar techniques to prevent agglomeration during the coating process. Methods for coating aluminum particles which can be used involve a fluidized bed reactor and are described in U.S. Pat. Nos. 6,613,383 and 6,713,177, which are incorporated herein by reference in their entireties. An additional example of a suitable coating process includes solution phase deposition. This type of deposition typically involves mixing a solution of catalyst metal salt (e.g., $PdCl_2$ or $CeCl_3$) with a slurry of metal core particles. The slurry can then be dried and then heated under a hydrogen atmosphere to reduce the salt to the catalytic metal (e.g., Pd). The metal may be present as a continuous film, or in the form of small nanoparticles dispersed on the metal core particle surface. In the case of a metal oxide catalyst (e.g., $CeO_2$), the reduced Ce film can be carefully oxidized prior to use, or can be allowed to oxidize in the initial stages of combustion.

The catalyst coating thickness and particle coverage can be sufficient to provide a measurable improvement in combustion properties of the fuel. The catalyst coating can therefore vary significantly in thickness and coverage, depending on the specific catalyst used and the coating technique employed. However, as a general guideline, the catalyst coating can have a thickness from about 0.5 nm to about 20 nm, and preferably from about 1 nm to about 5 nm. Alternatively, the catalyst can be in the form of small nanoparticles, e.g., about 0.5 to about 5 nm. Depending on the coating process used, the catalyst coating can cover substantially the entire particle. However, in many cases, the catalyst coating can be present over only portions of the particle, e.g., several catalyst islands. Therefore, in some embodiments, the catalyst coating can cover from about 10% to about 100% of the particle, and often from about 20% to about 50%.

The composite combustion catalyst particles of the present invention can be formed in almost any size which is suitable for a particular application. Generally, the particles can range from about 5 nm to about 1 mm, although sizes outside this range may also be suitable. Of particular interest are applications which involve high performance jet fuels where combustion rates are extremely short. In such applications, it can be desirable to use smaller particles in order to increase catalyst surface area. It should be kept in mind that smaller particles also decrease the volume of the metal core. As such, the heat of combustion of the composite catalyst particles is also reduced, i.e. a fuel mixed with such composite particles would have a decreased energy density. Thus, there is generally an optimal particle size which balances the increase in combustion rates and decrease in ignition delay times with the decrease in energy density of the fuel mixed with the composite particles.

Figure 1:
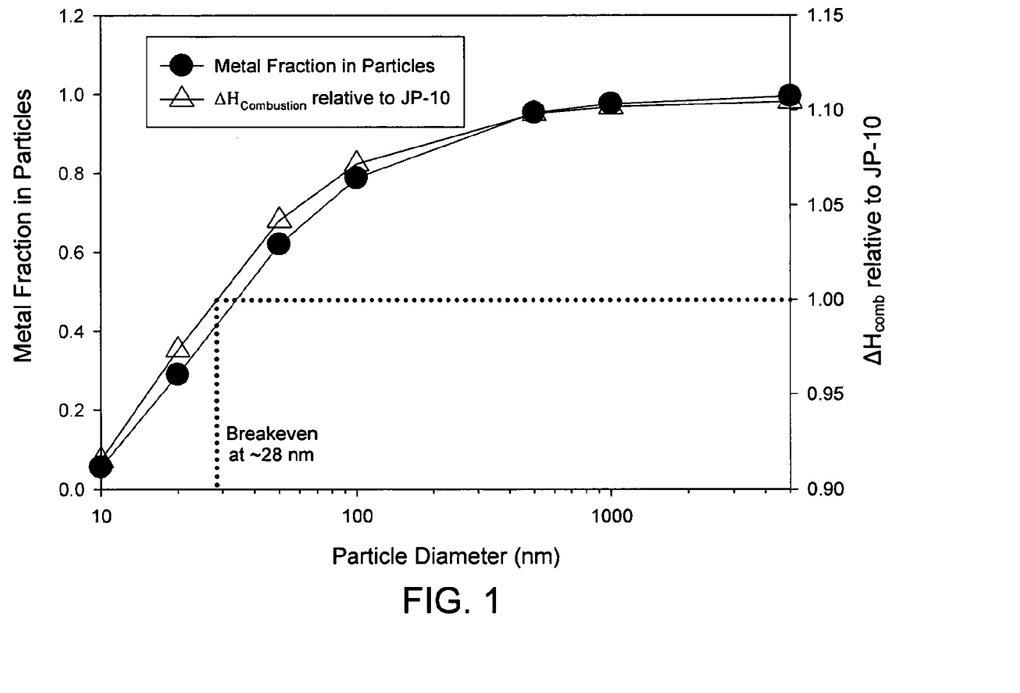
FIG. 1 is a graph illustrating volumetric heats of combustion and metal fraction versus particle size, relative to pure JP-10 fuel, for JP-10 fuel loaded with 10 volume % of aluminum nanoparticles.

FIG. 1 shows this effect with respect to aluminum nanoparticles. Specifically, the native aluminum oxide layer remains substantially about 3 nm regardless of the particle size. Therefore, as the particle size decreases, the proportion of aluminum also decreases for a given volume percent loading of the fuel/particle mixture (FIG. 1 is shown at 10% and 1000 K). As mentioned above, pure aluminum has a volumetric heat of combustion greater than JP-10. However, as the particle size decreases, the heat of combustion falls below that of the liquid fuel JP-10. FIG. 1 illustrates that, under these conditions, the minimum particle size where the particle heat of combustion is greater than that of JP-10 (i.e., the "break-even size") is about 28 nm. However, this effect is only a portion of the considerations of the present invention, since the catalytic effect of the catalyst layer can also influence the optimal size. In addition, for combustion of a typical hydrocarbon fuel with lower energy content than that of JP-10, the break-even size will be correspondingly smaller.

Figure 2:
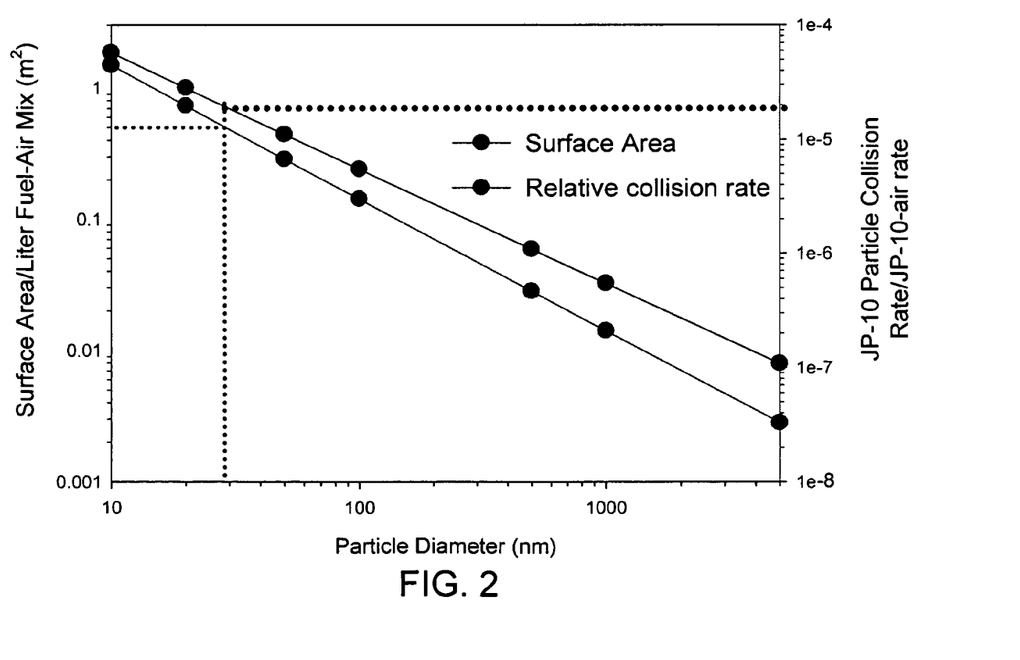
FIG. 2 is a graph illustrating particle surface area per volume of fuel-air mixture and particle collision rates versus particle size.
Figure 3:
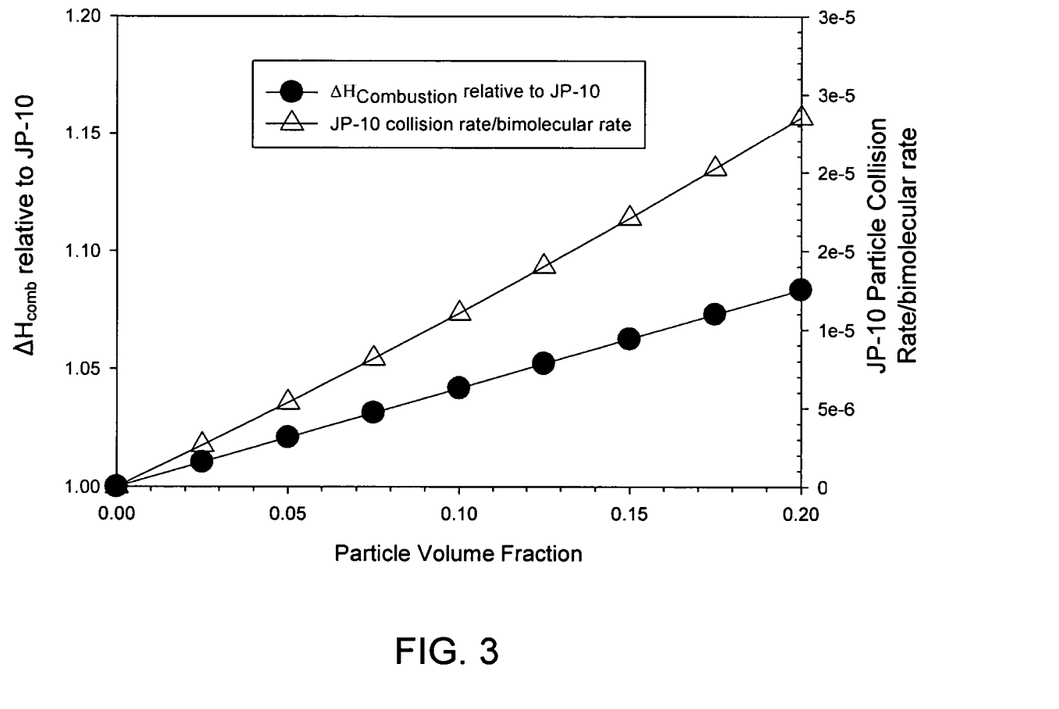
FIG. 3 is a graph illustrating heats of combustion relative to JP-10 and particle collision rates versus particle volume loading at 1000 K for 50 nm aluminum particles with 2.9 nm native oxide coatings (62% metal).

FIG. 2 illustrates the catalyst surface area per volume of enhanced fuel versus particle size at 10% particle loading by volume in the JP-10 fuel, as dispersed in stoichiometric air at a temperature of 1000K and 1 atm pressure. Also illustrated in FIG. 3 is the dependence on particle size of the relative rates of fuel-particle collisions and fuel-oxygen collisions. This graph demonstrates the increase in catalytic activity for smaller particles due to increase in surface area per volume of the fuel-air mixture.

FIG. 3 shows the variables of heat of combustion and relative particle/oxygen collision rates as a function of particle loading from 0% to 20% at a given particle size. Predictably, an increased particle loading results in increased collision rates and increase in heats of combustion relative to JP-10.

In one aspect of the present invention, the composite combustion catalyst particle can be a nanoparticle. Composite combustion catalyst nanoparticles having a diameter from about 10 nm to about 500 nm can be useful for a variety of high performance applications. Further, composite combustion catalyst nanoparticles having a diameter less than about 100 nm, and in some cases, particles having diameters from about 20 nm to about 100 nm can be particularly useful.

The composite combustion particles of the present invention can be used in a variety of applications. Several non-limiting examples of suitable applications include additives for liquid or solid propulsion fuels, explosives, munitions, or fuels for stationary power generation. In one preferred embodiment, the composite combustion catalyst particles can be used in fuels for high performance propulsion. Thus, in one aspect, an enhanced fuel can include a fuel and a plurality of composite combustion catalyst particles dispersed within the fuel.

In one aspect, the fuel can be a liquid fuel such as, but not limited to, jet propellant fuels, ramjet fuels, kerosene, and mixtures thereof. Suitable liquid fuels can include any fuel for which combustion thereof is catalyzed by the catalyst coatings of the present invention. Non-limiting examples of suitable liquid fuels can include jet propellant fuels (JP series), e.g., JP-4, JP-5, JP-7, JP-8, JP-9, and JP-10 (exotetrahydrodicyclopentadiene); ramjet fuels (RJ series), e.g., RJ1, RJ4

(tetrahydro-dimethycyclopentadiene), RJ5 (perhydrodi-norbomadiene), RJ6 (blend RJ5-JP10), and RJ9; KP-1, Jet-A, Jet-A1, Jet-B fuels, rocket propellants such as RP-1, kerosene, methylacetylene-propadiene, and other hydrocarbon based fuels. Currently, preferred liquid fuels include JP-10, kerosene, and Jet A fuel. In one aspect, the liquid fuel can be JP-10. Although the composition can vary considerably depending on the specific fuel, generally, the composite combustion catalyst particles can comprise from about 4 wt % to about 60 wt % of the enhanced liquid fuel. Typically, this composition also corresponds to a composite combustion catalyst particle content from about 1% to about 30% by volume. As an example, when using aluminum as the metal core, the preferred composition can be from about 5% to about 15% by volume, i.e. about 15 wt % to about 40 wt %.

Additionally, these liquid fuel systems can be part of bipropellants wherein the liquid fuel system is stored separately from an oxidizing agent and the two are mixed during operation. However, in the case of ramjets, scramjets, pulse-detonation engines, and other designs, the oxidizer can be provided by using oxygen from the air. Non-limiting examples of oxidizing agents can include oxygen, liquid oxygen, hydrogen peroxide, hydroxyl ammonium perchlorate (HAP), hydroxyl ammonium nitrate (HAN), ammonium perchlorate, ammonium nitrate, ammonium dinitramide (ADN), nitrogen tetroxide, nitric acid, liquid fluorine, and combinations thereof. Currently, oxygen is the most common oxidizer used. Other oxidizers and fuel compositions can be designed and prepared by those skilled in the art.

Alternatively, the enhanced fuel can include a solid fuel with the composite catalyst particles dispersed therein. A wide variety of solid rocket fuels are known and typically include a polymer or combustible metal with oxidizers and other additives. For example, polymers such as polymethyl methacrylate, high density polyethylene, hydroxyl terminated polybutadiene, and the like. Typical oxidizers that can be used in solid rocket fuels are ammonium perchlorate, potassium perchlorate, ammonium nitrate, liquid oxygen, hydrogen peroxide, nitrogen tetroxide, nitrous oxide, and occasionally fluorine. Composite fuels used for solid rocket fuels contain a high proportion of an oxidizing agent, e.g., 60% to 80%, and powdered aluminum, e.g., 5% to 10%. In accordance with the present invention, the composite catalyst particles can partially or wholly replace the powdered aluminum (or other metal). As a general guideline, the composite combustion catalyst particles can comprise from about 5 wt % to about 70 wt % of the enhanced solid fuel. Alternatively, the composite combustion catalyst particles can comprise from about 2 vol % to about 30 vol % of the enhanced solid fuel. Further, the composite catalyst particles of the present invention can be added to gelled fuels, e.g., RP-1 (aluminum metallized gelled kerosene), etc. Gelled fuels can be particularly desirable in that handling is easier and can be used in a wide variety of propulsion configurations. It will be understood that the above discussion is intended to be illustrative rather than exhaustive of potential fuel compositions to which the inventive catalyst particles can be added.

The presence of the catalyst coating can measurably decrease the ignition delay of enhanced fuels over those fuels which include uncoated metal particles of the same size. The enhanced fuels of the present invention can have an ignition delay of less than about 1 millisecond, and in some cases, from about 1 microsecond to about 200 microseconds.

An additional consideration in designing composite catalyst particles is the heat of combustion of the particles. As mentioned earlier, the metal core can enhance the energy density, while decreasing particle sizes decreases the effective volume of combustible metal. As a general guideline, the composite catalyst particles of the present invention can have a heat of combustion which is at least 80% of the volumetric heat of combustion of the fuel, and preferably at least about 90% of the volumetric heat of combustion of the fuel. Typically, the composite combustion catalyst particles can have a volumetric heat of combustion from about 80% to about 300% of the volumetric heat of combustion of the hydrocarbon fuel, and preferably from about 100% to about 250%. This effect of energy density can be balanced against the particle size. Specifically, as the particle size decreases, energy density decreases; however, catalytic effect per volume of composite particles increases due to a higher surface area. Regardless of the particular fuel, the composite combustion catalyst particles can comprise from about 5 wt % to about 70 wt % of the enhanced fuel.

The enhanced fuels of the present invention can be combusted using known configurations and systems, the performance of which can be improved by incorporation of the composite combustion catalyst particles described herein. Generally, combustion can be initiated in the presence of an oxidizing environment suitable for a particular fuel. Without being bound to a particular theory, it appears that the catalyst coating provides a catalytic effect to enhance combustion of the fuel. As the metal core begins to heat, the metal core begins to expand, which expansion results in stress cracks in the coatings of the composite particles. The exposed metal then contacts the oxidizer and combusts. Additionally, the metal core material and catalyst coating can react in a highly exothermic reaction, e.g., thermite-type reactions (in the case of an oxide catalytic coating), formation of intermetallics (in the case of a metallic catalytic coating), and the like. Specifically, the metal core can be formed of a metal having a higher affinity for oxygen than the catalyst metal. Thus, as the metal oxide coating cracks or is otherwise removed, the metal core and catalyst coating exothermically react to form metal oxides of the combustible metal and intermetallic compositions. Thus, the metal oxide layer also acts as a barrier which prevents the catalyst coating and metal core from reacting upon contact. This is at least one reason why aluminum is a preferred material for the metal core, i.e. aluminum is highly reactive with most metals and also has a higher affinity for oxygen than most metals.

Thus, the fuel and composite combustion catalyst particle are combusted such that the catalyst particles are single use and can be considered a catalyst and a fuel additive. The enhanced fuels of the present invention can be used in a variety of applications such as, but not limited to, propulsion, explosives, munitions, etc. These enhanced fuels can be particularly suited to use in pulse detonation engines, scramjet engines, and ramjet engines.

The following example illustrates a catalytic aspect of the invention. However, it is to be understood that the following is only exemplary or illustrative of certain aspects of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with one aspect of the present invention.

EXAMPLE

A mass spectrum of JP-10 ~5% in helium was obtained by electron impact (EI) ionization after passage through a room temperature flow tube reactor and was used as a reference point for JP-10 without decomposition. Similar EI mass spectra were obtained on JP-10 at 830 K, 920 K, and 1150 K. Additionally, an enhanced fuel mixture of JP-10 and cerium oxide particles as a catalyst, was subjected to ionization after passage through a flow tube reactor at the identified temperatures.

For these tests, a flow tube reactor was used having a 3 mm inside diameter alumina tube, the final 20 cm length can be heated by an external heater jacket. The average residence time of the flow in the hot zone of the reactor is on the order of 1 millisecond, and the pressure is low enough (~15 mbar at the upstream end of the tube) that diffusion mixes the gas during the flow, and ensures that the average JP-10 reactant molecule will collide at least several times with the tube walls. Gas exiting the tube is sampled through a skimmer orifice and then detected and analyzed using electron impact ionization mass spectrometry.

For the purpose of illustration, pure cerium oxide nanoparticles were used. By eliminating the combustible metal core that would be present in a combustion, propulsion, or explosives application, purely catalytic effects of the particle surfaces can be isolated and measured. When cerium oxide nanoparticles are added, JP-10 molecules may collide with cerium oxide particles in the heated gas stream. However, cerium oxide particles also tend to coat the tube walls, and collisions between the fuel and catalyst particles can occur at the walls as well. The gas and wall temperatures are similar, thus either type of particle collision can serve to illustrate catalytic effects.

At a temperature of 830 K, the results with no cerium oxide particles show relatively insubstantial changes from the reference spectrum obtained at 300 K. However, addition of the cerium oxide particles significantly decreased the high mass peaks, indicting that JP-10 reacted at 830 K. Furthermore, new peaks appear at low masses corresponding to 18 (water), 28 (CO), 30 ($H_2CO$ or $C_2H_6$), 44 ($CO_2$), for example. The spectrum clearly shows that oxygen is being incorporated into the products, and the only source of oxygen in this system is cerium oxide. Under similar conditions, no oxygen-containing products were observed even for JP-10/$O_2$/helium flows containing up to equimolar amounts of JP-10 and oxygen.

At a temperature of 920 K, some JP-10 decomposition occurs in the absence of cerium oxide, i.e. about half of the JP-10. Under these conditions, the lower mass hydrocarbon peaks in the spectrum come from electron impact ionization of the products of thermal decomposition of JP-10, and electron-ionization-induced fragmentation of the residual JP-10 surviving passage through the hot flow tube. When cerium oxide was added, a significant reduction in the high mass peaks indicated reaction of JP-10, and increases in low mass peaks, from ionization of reaction products.

Figure 4:
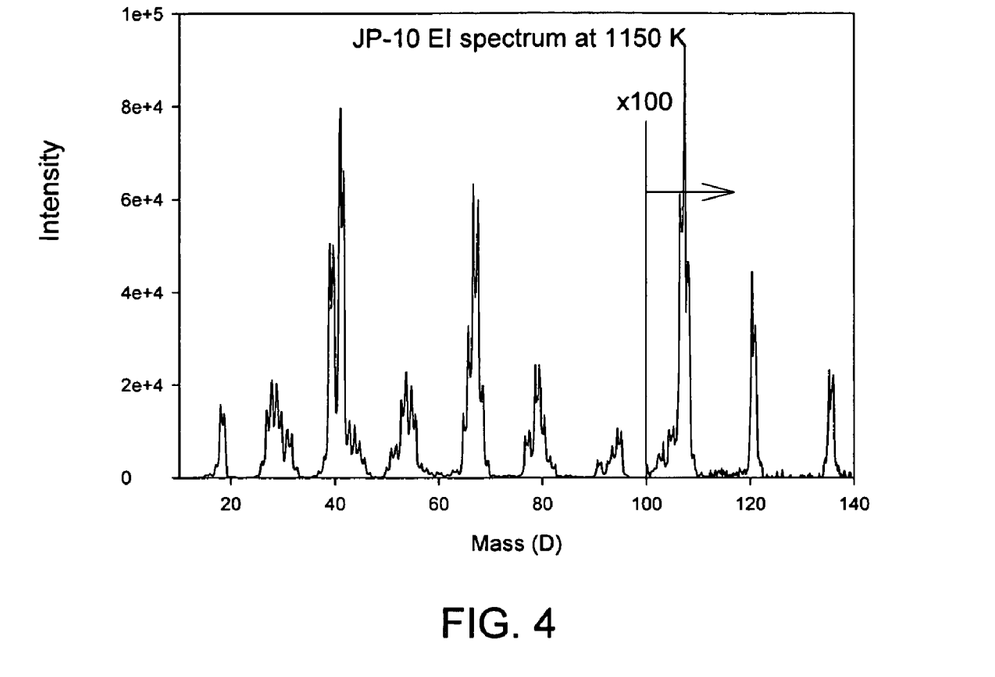
FIG. 4 is a mass spectra of JP-10 (~5%) in helium taken by electron impact ionization after passage through a flow tube reactor at a temperature of 1150 K.

FIG. 4 shows the EI mass spectra of JP-10 ~5% in helium after passage through a flow tube reactor at a temperature of 1150 K. The spectra shows that at this high temperature, JP-10 is mostly decomposed, even in absence of cerium oxide. The high mass region of the spectrum has been scaled by a hundred to highlight residual JP-10 peaks. In absence of cerium oxide, the spectrum is dominated by peaks derived from electron impact ionization of hydrocarbon products of the JP-10 thermal decomposition.

Figure 5:
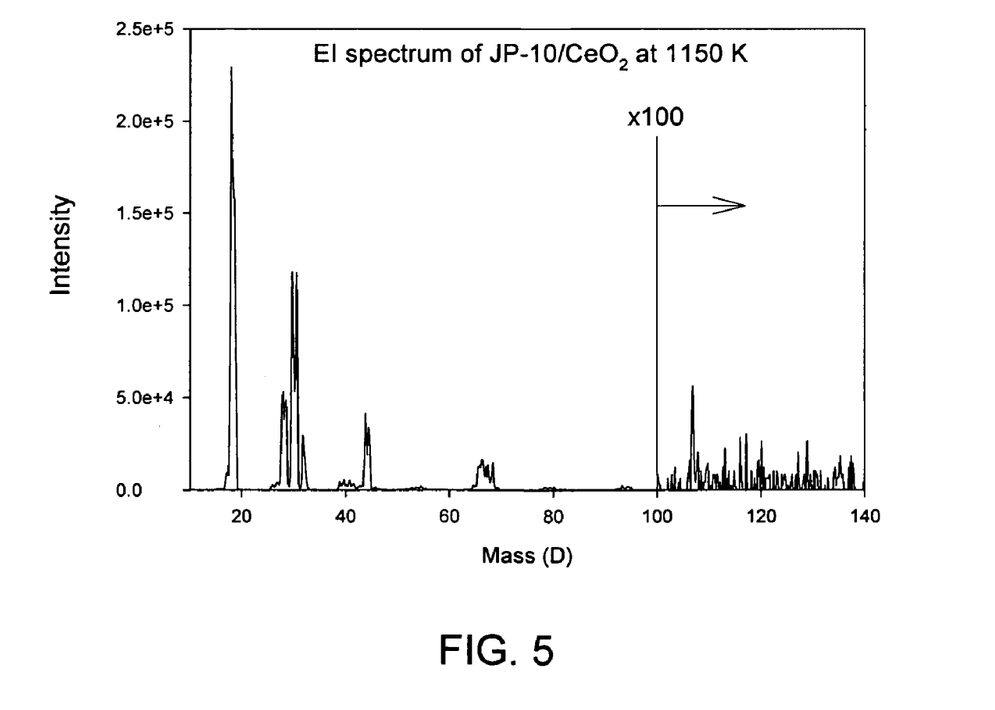
FIG. 5 is a mass spectra of JP-10 mixed with $CeO_2$ particles in helium taken by electron impact ionization after passage through a flow tube reactor at a temperature of 1150 K.

FIG. 5 shows the EI mass spectra of JP-10 with cerium oxide nanoparticles at 1150 K. In this case, the residual JP-10, i.e. high mass peaks, completely disappears, and the product spectrum changes dramatically from the hydrocarbons found in the top spectrum, to oxygen-containing species such as water (mass 18), CO (28), $H_2CO$ (presumed to be the main contributor to mass 30), and $CO_2$ (44).

These results indicate that substantial catalytic effects can result from a few collisions of JP-10 with cerium oxide nanoparticles, including lowering of the minimum temperature required for a given extent of decomposition, increased extent of decomposition at a given temperature, and appearance of unique products derived from reaction with cerium oxide surfaces.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A composite combustion catalyst particle, comprising:
   a) a metal core including a combustible metal;
   b) a metal oxide coating at least partially surrounding the metal core; and
   c) a catalyst coating at least partially surrounding the metal oxide coating, wherein the composite combustion catalyst particle has a diameter from about 10 nm to about 500 nm.

2. The composite combustion catalyst of claim 1, wherein the combustible metal comprises a member selected from the group consisting of aluminum, boron, magnesium, silicon, titanium, lithium, sodium, potassium, and alloys or composites thereof.

3. The composite combustion catalyst of claim 2, wherein the combustible metal is aluminum.

4. The composite combustion catalyst of claim 1, wherein the metal core has a heat of combustion greater than about 25,000 kJ/liter.

5. The composite combustion catalyst of claim 1, wherein the metal oxide coating comprises a metal oxide of the combustible metal.

6. The composite combustion catalyst of claim 1, wherein the metal oxide coating has a thickness of about 1 nm to about 10 nm.

7. The composite combustion catalyst of claim 1, wherein the catalyst coating comprises a member selected from the group consisting of cerium oxide, palladium oxide, tin oxide, manganese oxide, yttrium oxide, iron oxide, cobalt oxide, palladium, platinum, nickel, and composites, intermetallics, or alloys thereof.

8. The composite combustion catalyst of claim 1, wherein the catalyst coating has a thickness from about 0.5 nm to about 20 nm.

9. The composite combustion catalyst of claim 1, wherein the composite combustion catalyst particle is a nanoparticle.

10. The composite combustion catalyst of claim 1, wherein the composite combustion catalyst particle has a diameter from about 20 nm to about 100 nm.

11. An enhanced fuel, comprising a fuel and a plurality of composite combustion catalyst particles as in claim 1.

12. An enhanced fuel of claim 11, wherein the fuel is a liquid fuel selected from the group consisting of jet propellant fuels, ramjet fuels, kerosene, rocket fuels, and mixtures thereof.

13. The enhanced fuel of claim 12, wherein the liquid fuel is JP-10.

14. The enhanced fuel of claim 11, wherein the fuel is a solid fuel.

15. The enhanced fuel of claim 11, wherein the composite combustion catalyst has a heat of combustion within about 20% of a heat of combustion of the fuel.

16. The enhanced fuel of claim 11, wherein the plurality of composite combustion catalyst particles comprise from about 2 wt % to about 25 wt % of the enhanced fuel.

17. An enhanced fuel, comprising: a) a fuel; and b) a plurality of composite combustion catalyst particles dispersed within the fuel, said composite combustion catalyst particles including: i) a metal core including a combustible metal; ii) a metal oxide coating at least partially surrounding the metal core; and iii) a catalyst coating at least partially surrounding the metal oxide coating, wherein the composite combustion catalyst particle has a diameter from about 10 nm to about 500 nm.

18. The enhanced fuel of claim 17, wherein the fuel is a liquid fuel.

19. The enhanced fuel of claim 18, wherein the liquid fuel is selected from the group consisting of jet propellant fuels, ramjet fuels, kerosene, rocket fuels, and mixtures thereof.

20. The enhanced fuel of claim 19, wherein the liquid fuel is JP-10.

21. The enhanced fuel of claim 17, wherein the fuel is a solid fuel.

22. The enhanced fuel of claim 17, wherein the enhanced fuel has an ignition delay from about 1 microsecond to about 200 microseconds.

23. The enhanced fuel of claim 17, wherein the composite combustion catalyst has a heat of combustion within about 20% of a heat of combustion of the fuel.

24. The enhanced fuel of claim 17, wherein the plurality of composite combustion catalyst particles comprise from about 2 wt % to about 25 wt % of the enhanced fuel.

25. The enhanced fuel of claim 17, wherein the combustible metal comprises a member selected from the group consisting of aluminum, boron, silicon, titanium, lithium, sodium, potassium, magnesium, and alloys or composites thereof.

26. The enhanced fuel of claim 17, wherein the catalyst coating comprises a member selected from the group consisting of cerium oxide, palladium oxide, tin oxide, manganese oxide, yttrium oxide, iron oxide, cobalt oxide, palladium, platinum, nickel, and composites, intermetallics, or alloys thereof.

27. The enhanced fuel of claim 17, wherein the composite combustion catalyst is a nanoparticle.

28. A composite combustion catalyst particle, comprising:
a) a metal core including a combustible metal;
b) a metal oxide coating at least partially surrounding the metal core, wherein the metal oxide coating has a thickness of about 1 nm to about 10 nm; and
c) a catalyst coating at least partially surrounding the metal oxide coating.

29. A composite combustion catalyst particle, comprising:
a) a metal core including a combustible metal;
b) a metal oxide coating at least partially surrounding the metal core; and
c) a catalyst coating at least partially surrounding the metal oxide coating, wherein the catalyst coating has a thickness from about 0.5 nm to about 20 nm.

30. A method of making composite combustion catalyst particles, comprising the steps of: a) providing metal core particulates including a combustible metal; b) forming a metal oxide coating substantially surrounding the metal core; and C) forming a catalyst coating on at least a portion of the metal oxide coating, wherein the composite combustion catalyst has a diameter from about 10 nm to about 500 nm.

31. The method of claim 30, wherein the step of forming a metal oxide coating includes exposing the metal core to an oxygen-containing atmosphere.

32. The method of claim 30, wherein the step of forming a catalyst coating by a process selected from the group consisting of chemical vapor deposition, physical vapor deposition, solution phase deposition, and combinations thereof.

33. The method of claim 30, wherein the combustible metal comprises a member selected from the group consisting of aluminum, boron, silicon, titanium, lithium, sodium, potassium, magnesium, and alloys or composites thereof.

34. The method of claim 30, wherein the catalyst coating comprises a member selected from the group consisting of cerium oxide, palladium oxide, tin oxide, manganese oxide, yttrium oxide, iron oxide, cobalt oxide, palladium, platinum, nickel, and composites, intermetallics, or alloys thereof.

35. The method of claim 30, wherein the composite combustion catalyst is a nanoparticle.

36. A method of combusting a fuel, comprising the steps of: a) providing an enhanced fuel including a plurality of composite combustion catalyst particles dispersed in a fuel, said composite combustion catalyst particles including; i) a metal core including a combustible metal; ii) a metal oxide coating at least partially surrounding the metal core; and iii) a catalyst coating at least partially surrounding the metal oxide coating, wherein the composite combustion catalyst has a diameter from about 10 nm to about 500 nm; b) providing an oxidizing environment; and c) initiating combustion of the enhanced fuel in the presence of the oxidizing environment.

37. The method of claim 36, wherein the plurality of composite combustion catalyst particles comprise from about 2 wt % to about 25 wt % of the enhanced fuel.

38. The method of claim 36, wherein the combustible metal comprises a member selected from the group consisting of aluminum, boron, silicon, titanium, lithium, sodium, potassium, magnesium, and alloys or composites thereof.

39. The method of claim 36, wherein the catalyst coating comprises a member selected from the group consisting of cerium oxide, palladium oxide, tin oxide, manganese oxide, Atrium oxide, iron oxide, cobalt oxide, palladium, platinum, nickel, and composites, intermetallics, or alloys thereof.

40. The method of claim 36, wherein the composite combustion catalyst is a nanoparticle.

41. The method of claim 36, wherein the oxidizing environment comprises a member selected from the group consisting of oxygen, hydrogen peroxide, liquid oxygen, hydroxyl ammonium perchlorate, hydroxyl ammonium nitrate, ammonium perchlorate, ammonium nitrate, ammonium dinitramide, nitrogen tetroxide, nitric acid, liquid fluorine, and combinations thereof.

42. The method of claim 36, wherein enhanced fuel has an ignition delay from about 1 microsecond to about 200 microseconds.

43. The method of claim 36, wherein the composite combustion catalyst has a heat of combustion within about 20% of a heat of combustion of the fuel.

* * * * *

UNITED STATES PATENT AND TRADEMARK OFFICE
CERTIFICATE OF CORRECTION

| | |
|---|---|
| PATENT NO. | : 7,635,461 B2 |
| APPLICATION NO. | : 10/862829 |
| DATED | : December 22, 2009 |
| INVENTOR(S) | : Scott L. Anderson |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1598 days.

Signed and Sealed this

Ninth Day of November, 2010

David J. Kappos
*Director of the United States Patent and Trademark Office*